United States Patent
Liu et al.

(10) Patent No.: US 8,528,870 B2
(45) Date of Patent: Sep. 10, 2013

(54) RETAINING DEVICE FOR STAND FOR SAWING MACHINE

(75) Inventors: Chia-Sheng Liu, Taichung County (TW); Chen-Yuan Chen, Taichung County (TW)

(73) Assignee: Durq Machinery Corp., Taichung (TW)

( * ) Notice: Subject to any disclaimer, the term of this patent is extended or adjusted under 35 U.S.C. 154(b) by 736 days.

(21) Appl. No.: 12/635,033

(22) Filed: Dec. 10, 2009

(65) Prior Publication Data

US 2011/0067207 A1   Mar. 24, 2011

(30) Foreign Application Priority Data

Sep. 23, 2009   (TW) ................ 98132160 A

(51) Int. Cl.

| A47B 96/06 | (2006.01) |
|---|---|
| E04G 3/00 | (2006.01) |
| F16B 1/00 | (2006.01) |
| A47G 1/10 | (2006.01) |
| B25H 1/00 | (2006.01) |
| B25B 1/00 | (2006.01) |
| B25B 1/16 | (2006.01) |
| B23Q 1/25 | (2006.01) |
| B23Q 3/02 | (2006.01) |

(52) U.S. Cl.
USPC ............ 248/214; 248/229.11; 248/229.21; 248/228.2; 248/230.2; 248/231.31; 248/316.2; 248/227.4; 144/286.5; 144/287; 269/6; 269/254 CS; 269/66; 269/138; 269/217

(58) Field of Classification Search
USPC ............ 248/214, 229.11, 226.11, 229.21, 248/228.2, 230.2, 231.31, 316.2, 411, 245, 248/689, 229.12, 229.22, 227.2, 227.4, 248/228.1–228.3, 230.1–230.3, 231.9, 231.61, 248/227.1, 231.85, 231.41, 316.4; 403/385; 24/535, 568, 565; 144/286.5, 287; 269/6; 269/254 CS, 66, 138, 217
See application file for complete search history.

(56) References Cited

U.S. PATENT DOCUMENTS

| 5,659,904 | A | * | 8/1997 | Doczy et al. ................... 4/577.1 |
|---|---|---|---|---|
| 6,860,669 | B2 | * | 3/2005 | Laisement et al. ......... 403/109.1 |
| 7,222,648 | B2 | * | 5/2007 | Liu et al. .................... 144/286.5 |
| 7,566,038 | B2 | * | 7/2009 | Scott et al. ............... 248/231.61 |
| 7,854,187 | B2 | * | 12/2010 | Liu et al. ...................... 83/471.3 |
| 2003/0226943 | A1 | * | 12/2003 | Laisement et al. ......... 248/230.2 |
| 2006/0272744 | A1 | * | 12/2006 | Liu et al. .................... 144/286.5 |
| 2010/0117281 | A1 | * | 5/2010 | Doyle ............................. 269/97 |
| 2010/0299890 | A1 | * | 12/2010 | Doyle .............................. 24/457 |
| 2011/0067207 | A1 | * | 3/2011 | Liu et al. ......................... 24/457 |
| 2011/0198477 | A1 | * | 8/2011 | Bergmann et al. ............ 248/647 |
| 2012/0199248 | A1 | * | 8/2012 | Ayala et al. ................ 144/286.1 |

* cited by examiner

*Primary Examiner* — Terrell McKinnon
*Assistant Examiner* — Christopher Garft
(74) *Attorney, Agent, or Firm* — Browdy and Neimark, PLLC

(57) ABSTRACT

A retaining device for a stand includes a base, a shaft inserted in the base, a handle pivotally mounted on the shaft, and a retainer sleeved on a cam portion of the handle. When the handle is pivotally moved downwards, the retainer can be driven to move toward an extending rod of the stand by actuation of the cam portion of the handle for stopping against the extending rod of the stand and retaining the extending rod of the stand in position.

3 Claims, 9 Drawing Sheets

US 8,528,870 B2

RETAINING DEVICE FOR STAND FOR SAWING MACHINE

BACKGROUND OF THE INVENTION

1. Field of the Invention

The present invention relates generally to a stand for supporting a sawing machine, and more specifically to a retaining device capable of thinly retaining an extending rod of a stand for allowing the stand to stably support a sawing machine thereon.

2. Description of the Related Art

FIG. 1 shows a conventional stand 10 for supporting a sawing machine, comprising a pair of supporting rods 12 arranged in a parallel manner, and two pairs of legs 14. Each leg 14 is pivotally connected to one end of one of the supporting rods 12. In order to support sawing machines of different sizes, the stand 10 is equipped with two extending rods 16, each of which is inserted into one of the supporting rods 12 and can be drawn out of the respective supporting rod 12 to a desired length according to the size of the sawing machine 10.

After the extending rods 16 are drawn out, a plastic head screw 18 is screwed to each of the supporting rods 12. Each of the plastic head screws 18 has a distal end stopped against one of the extending rods 16 for retaining the extending rods 16. However, the plastic head screw 18 has a limited ability to retain the extending rod 16, and thus the extending rods 16 may be unstable and/or shaken during the operation of the sawing machine even though the plastic head screws 18 are tightened, influencing the safety of using the sawing machine.

SUMMARY OF THE INVENTION

It is one objective of the present invention to provide a retaining device for a stand, which can provide an improved structural stability when it is used to secure an element of the stand.

It is another objective of the present invention to provide a retaining device for a stand, which can be adjusted to the optimal state in the light of actual needs.

To achieve this objective of the present invention, the retaining device comprises a base having a through hole for penetration of an extending rod of the stand, a shaft inserted in the base, a handle having a cam portion and an eccentric hole through the cam portion and pivotally mounted on the shaft through the eccentric hole, and a retainer moveably mounted in the base having a receiving hole in which the cam portion of the handle is received. The cam portion of the handle can be driven by a pivotal movement of the handle to force the retainer to stop against the extending rod, thereby holding the extending rod in position.

In a preferred embodiment of the present invention, the retaining device further comprises an adjustment unit that is used for controlling the degree of tightness of the handle on movement according to different needs, thereby enhancing convenience of operating the retaining device of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
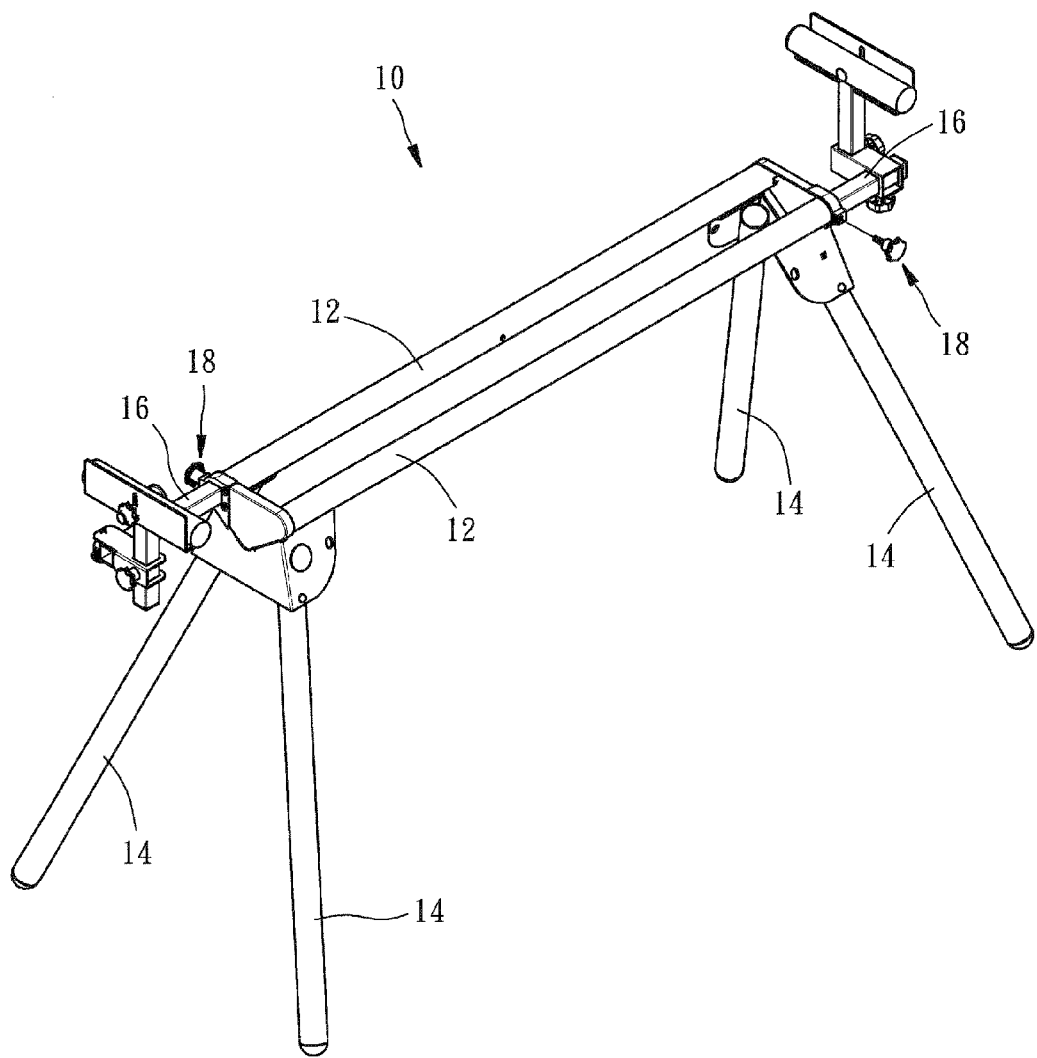
FIG. 1 is a perspective view of a stand according to a prior art.
Figure 2:
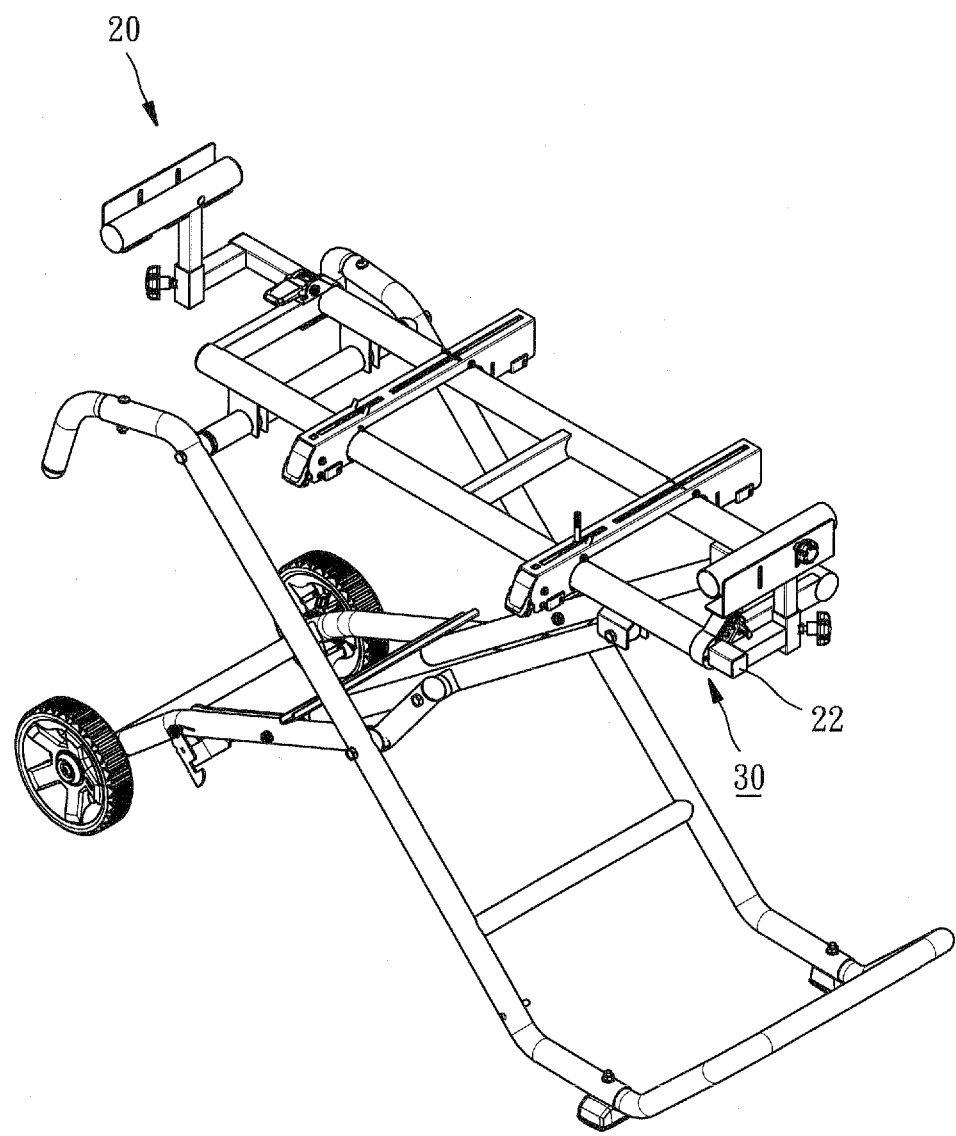
FIG. 2 is a perspective view of a stand installed with a retaining device according to a first preferred embodiment of the prevent invention.
Figure 3:
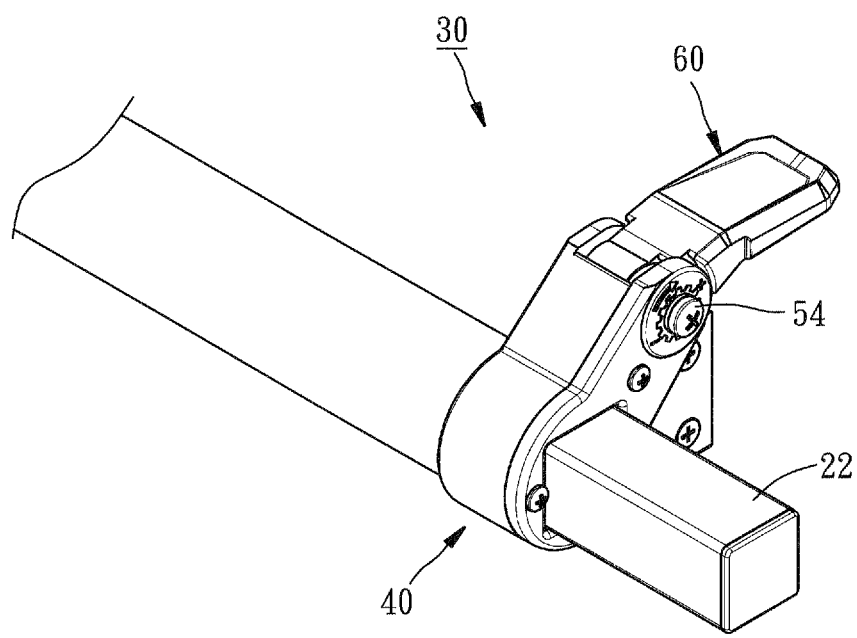
FIG. 3 is an enlarged view of a part of FIG. 2, showing the retaining device according to the first preferred embodiment of the prevent invention.
Figure 4:
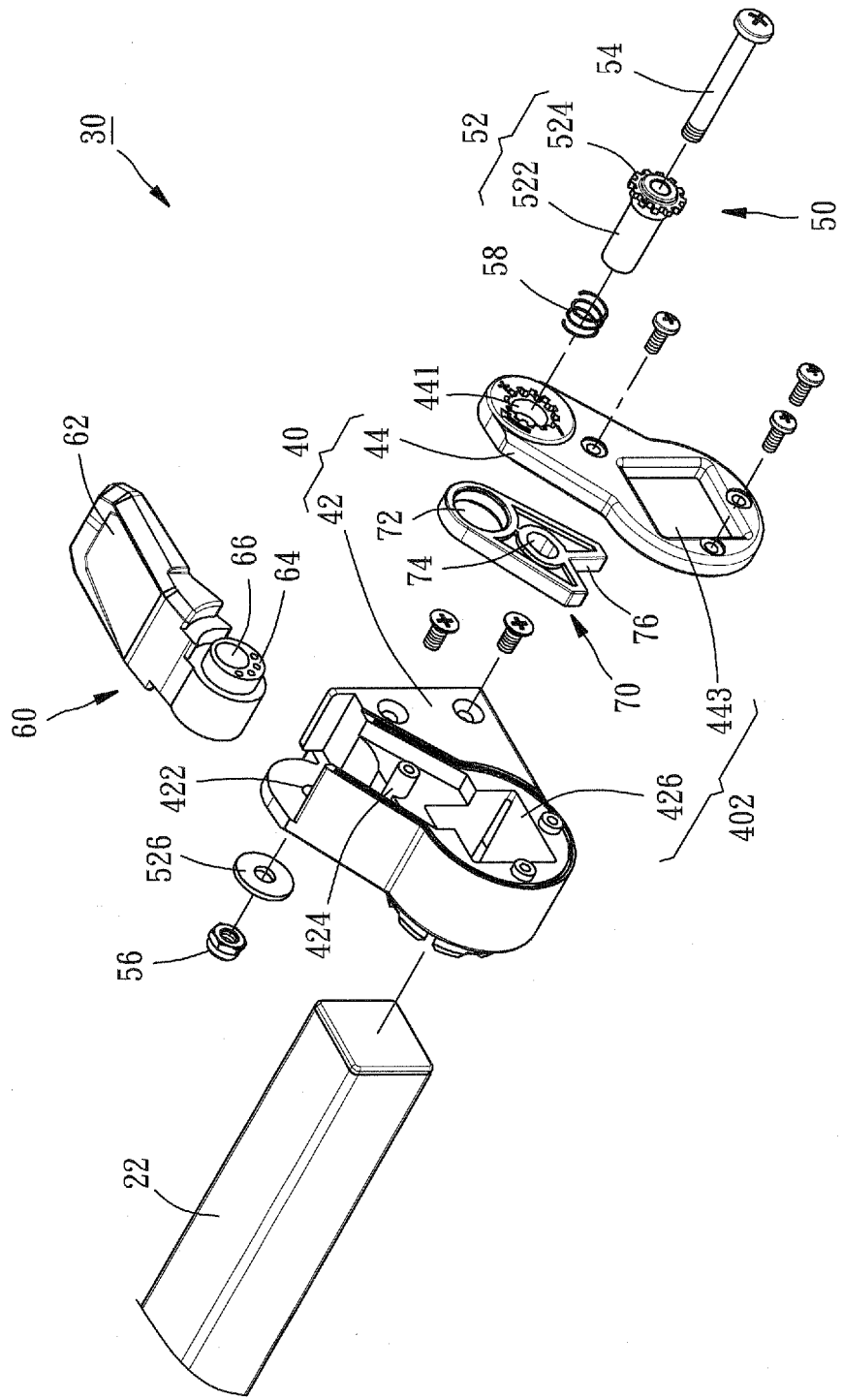
FIG. 4 is an exploded view of the retaining device according to the first preferred embodiment of the prevent invention.

As shown in FIG. 2, a retaining device 30 in accordance with a first preferred embodiment of the present invention is used in cooperation with a stand 20 for locking an extending rod 22 of the stand 20 in a desired position. As shown in FIGS. 3-4, the retaining device 30 comprises a base 40, an adjustment unit 50, a handle 60, and a retainer 70.

The base 40 includes a base body 42 having a retaining hole 422, a protrusion 424, and a first square hole 426, and a cover 44 mounted to one side of the base body 42 and having a teeth hole 441 aligned with the retaining hole 422, and a second square hole 443 communicated with the first square hole 426 such that the first and second square holes 426 and 443 define a through hole 402 through the base 40 for penetration of the extending rod 22 of the stand 20.

Figure 8:
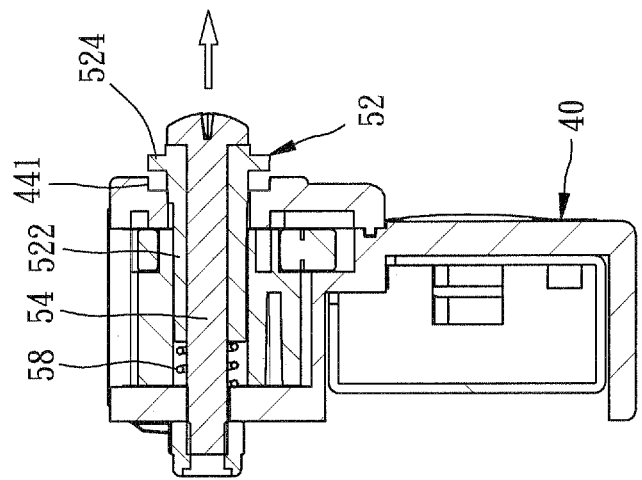
FIG. 8 is a sectional view of the retaining device according to the first preferred embodiment of the prevent invention, showing the screw is loosened.
Figure 7:
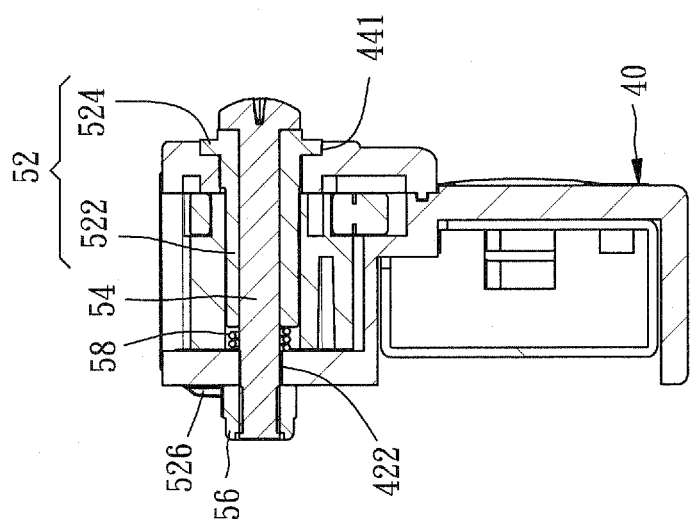
FIG. 7 is a sectional view of the retaining device according to the first preferred embodiment of the prevent invention, showing the screw is tightened.

Referring to FIGS. 4 and 7, the adjustment unit 50 includes a shaft 52, a screw 54, a nut 56, and an elastic member 58. The shaft 52 has an eccentric shaft portion 522 and a teeth portion 524 at an end of the eccentric shaft portion 522. The screw 54 is inserted through the shaft 52 and provided with a distal end passing through the retaining hole 422 of the base 40. The nut 56 is screwed to the distal end of the screw 54, and a washer 526 can be provided between the nut 56 and the base body 42 of the base 40. When the screw 54 is tightened, the teeth portion 524 of the shaft 52 and the teeth hole 441 of the base 40 are engaged with each other, as shown in FIG. 7, preventing the shaft 52 from rotation. The elastic member 58 is sleeved onto the screw 54 and has two ends respectively stopped against the base body 42 of the base 40 and a distal end of the shaft 52. When the screw 54 is loosened, the teeth portion 524 of the shaft 52 is disengaged from the teeth hole 441 of the base 40 because the teeth portion 524 of the shaft 52 is pushed away from the teeth hole 441 of the base 40 due to the elastic rebound force generated by the elastic member 58, as shown in FIG. 8, allowing the shaft 52 to be rotatable.

The handle 60 includes an arm portion 62, a cam portion 64 at an end of the arm portion 62, and an eccentric hole 66 through the cam portion 64. The handle 60 is sleeved on the eccentric shaft portion 522 of the shaft 52 by means of the eccentric hole 66 such that the handle 60 is pivotable relative to the shaft 52.

The retainer 70 includes a receiving hole 72 in which the cam portion 64 of the handle 60 is rotatably received, an elongated hole 74 for insertion of the protrusion 424 of the base 40, and a V-shaped urging surface 76 for stopping against two sides of the extending rod 22.

Figure 5:
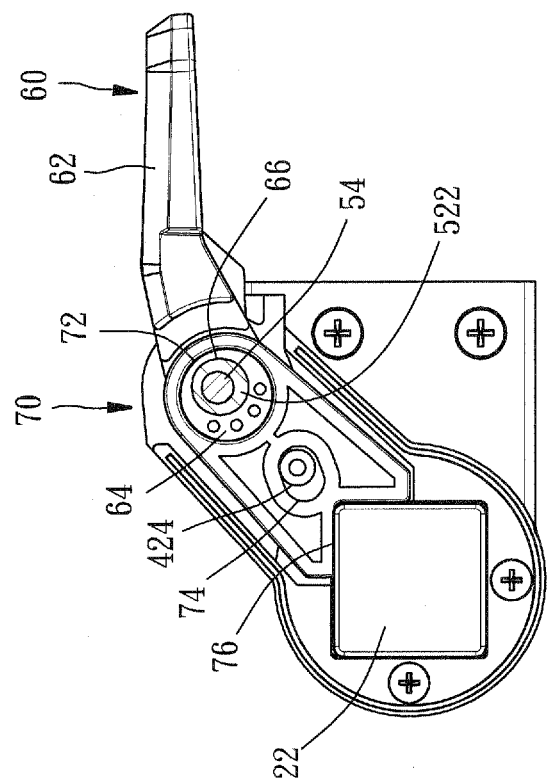
FIG. 5 is a partially cutaway view of the retaining device according to the first preferred embodiment of the prevent invention, showing the handle is pivotally moved downwards.

Once the extending rod 22 of the stand 20 is drawn out to a desired length, a user can press the arm portion 62 of the handle 60 to drive the cam portion 64 of the handle 60 to rotate downwards such that the cam portion 64 of the handle 60 can push the retainer 70 toward the extending rod 22 through its large diameter section until the urging surface 76 of the retainer 70 is stopped against the extending rod 22, as shown in FIG. 5, thereby retaining the extending rod 22 in position.

Figure 6:
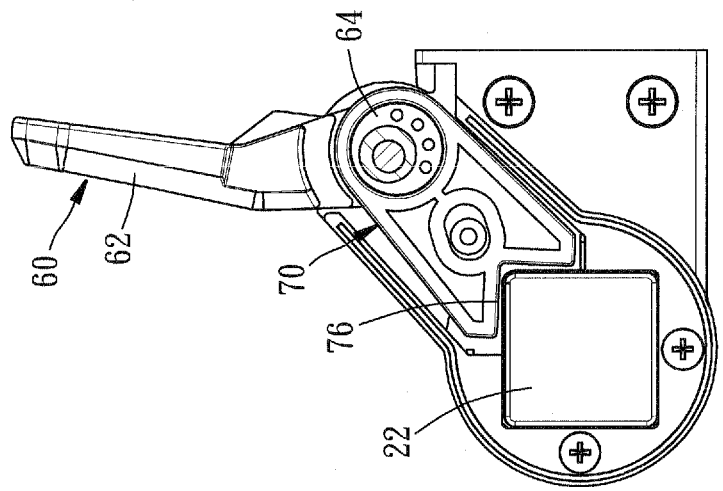
FIG. 6 is a partially cutaway view of the retaining device according to the first preferred embodiment of the prevent invention, showing the handle is pivotally moved upwards.

To adjust the length of the extending rod 22 of the stand 20, the user can lift the arm portion 62 of the handle 60 to drive the retainer 70 to move away from the extending rod 22 through the large diameter section of the cam portion 64 of the handle 60, as shown in FIG. 6, enabling the length of the extending rod 22 to be adjustable.

Further, if the user would like to adjust the degree of tightness of the handle 60 on movement, a screwdriver can be used to loose the screw 54 of the adjustment unit 50, such that the elastic member 58 pushes the shaft 52 to move outwards so as to make the teeth portion 524 of the shaft 52 disengage from the teeth hole 441 of the base 40, as shown in FIG. 8. At this time, if the user would like to increase the degree of tightness of the handle 60 on movement, the user can turn the shaft 52 to rotate clockwise to make a large diameter section of the eccentric shaft portion 522 be gradually abutted against a periphery wall of the eccentric hole 66 of the handle 60. On the other hand, the shaft 52 can be rotated counterclockwise if the user would like to decrease the degree of tightness of the handle 60 on movement. Once the handle 60 is adjusted to a suitable degree of tightness on movement, the user can use the screwdriver to tighten the screw 54 so as to make the teeth portion 524 of the shaft 52 be again engaged with the teeth hole 441 of the base 40, as shown in FIG. 7.

Figure 9:
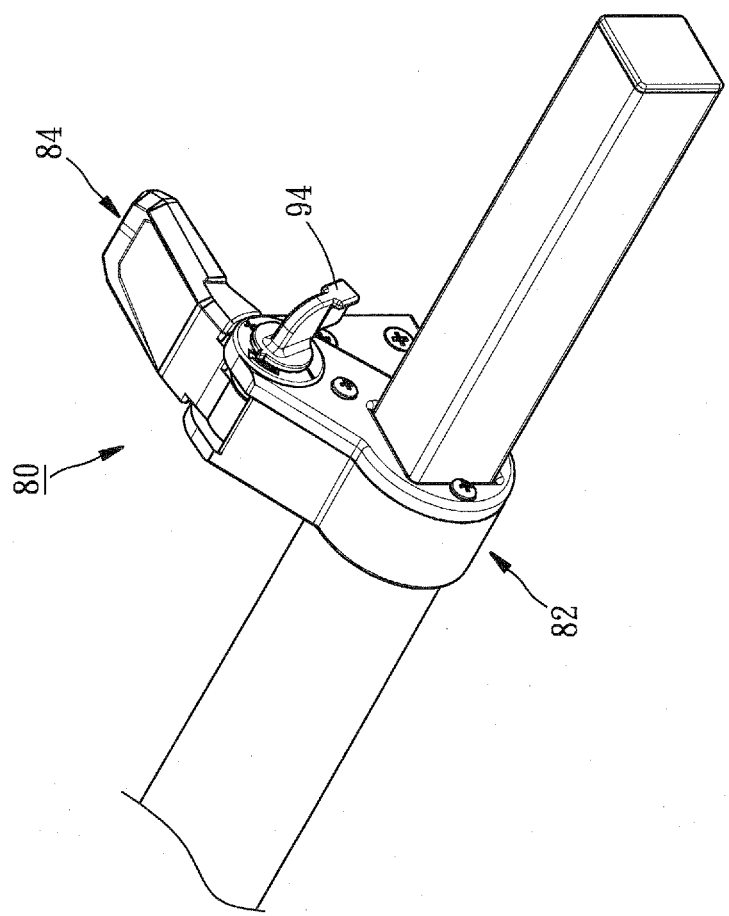
FIG. 9 is a perspective view of the retaining device according to a second preferred embodiment of the prevent invention.
Figure 10:
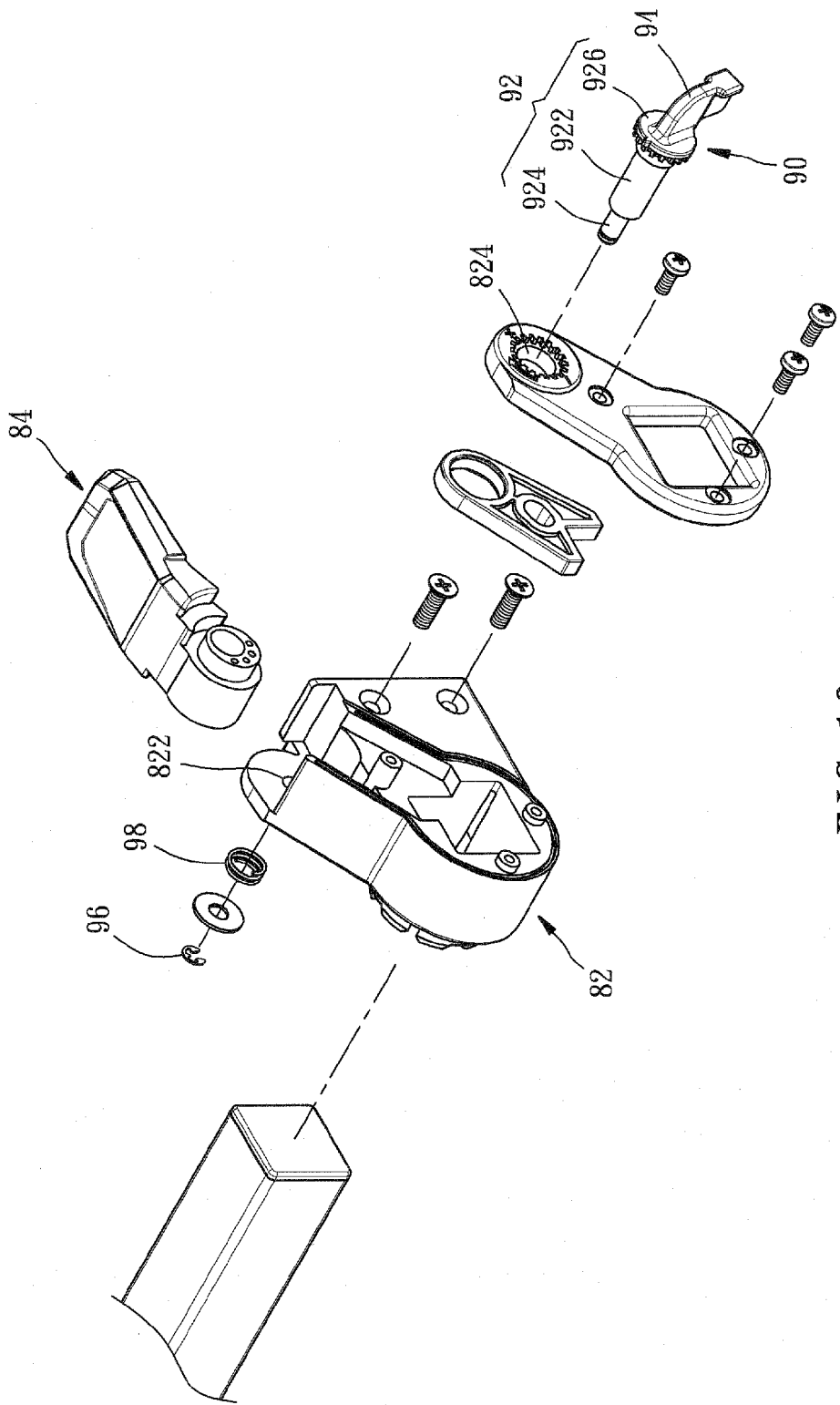
FIG. 10 is an exploded view of the retaining device according to the second preferred embodiment of the prevent invention.

FIGS. 9 and 10 illustrate a retaining device 80 in accordance with a second embodiment of the present invention. This second embodiment is substantially similar to the aforesaid first embodiment with the exception of the structure of the adjustment unit.

According to this second embodiment, the adjustment unit 90 comprises a shaft 92, a grip 94, a fastener 96, and an elastic member 98.

Figure 11:
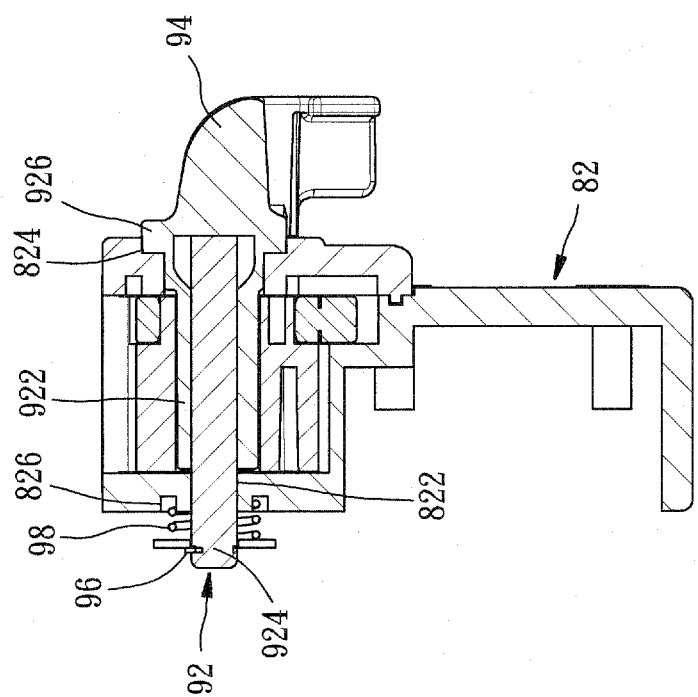
FIG. 11 is a partially cutaway view of the retaining device according to the second preferred embodiment of the prevent invention.

Referring to FIGS. 10 and 11, the shaft 92 has an eccentric shaft portion 922, a tail portion 924 protruding from the eccentric shaft portion 922 and passing through the retaining hole 822 of the base 82, and a teeth portion 926 at an end of the eccentric shaft portion 922 and engageable with the teeth hole 824 of the base 82.

The grip 94 is mounted on the teeth portion 926 of the shaft 92 so as to be driven by an external force to move the shaft 92 along an axial direction of the shaft 92. By means of the movement of the shaft 92, the teeth portion 926 of the shaft 92 can be engaged with or disengaged from the teeth hole 824 of the base 82, and furthermore the shaft 92 is rotatable when the teeth portion 926 of the shaft 92 is disengaged from the teeth hole 824 of the base 82.

The fastener 96 is fastened to the tail portion 924 of the shaft 92 for preventing the shaft 92 from separation from the base 82.

The elastic member 98 is sleeved on the tail portion 924 of the shaft 92, having two ends respectively stopped against the fastener 96 and a bottom of a recess 826 of the base 82 for providing an elastic force to keep the teeth portion 926 of the shaft 92 engaged with the teeth hole 824 of the base 82.

Figure 12:
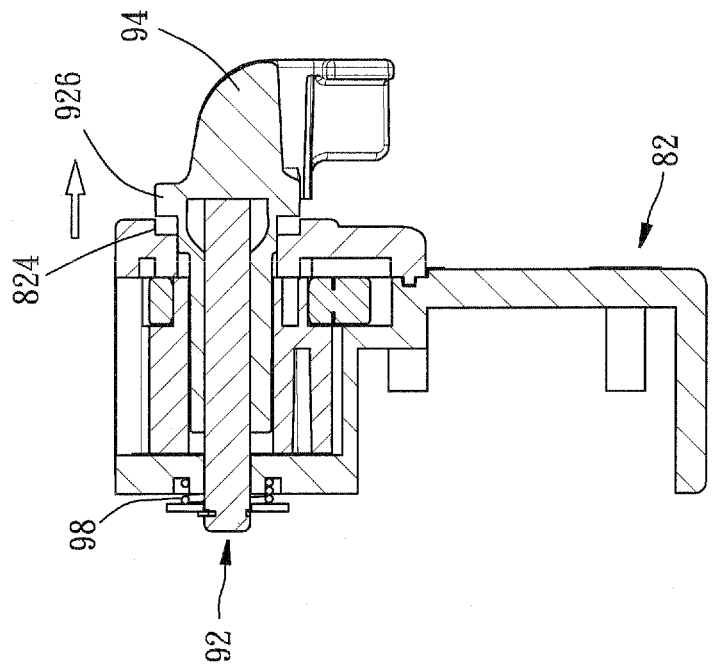
FIG. 12 is a partially cutaway view of the retaining device according to the second preferred embodiment of the prevent invention, showing the shaft is drawn out.

When wanting to adjust the tightness of the handle 84, the use can draw out the shaft 92 through the grip 94 to disengage the teeth portion 926 of the shaft 92 from the teeth hole 824 of the base 82, as shown in FIG. 12, such that the shaft 92 is rotatable. Once the shaft 92 is adjusted to a desired degree of tightness, the user can loosen the grip 94 to enable the teeth portion 926 of the shaft 92 and the teeth hole 824 of the base 82 to be engaged with each other through the elastic rebound force generated by the elastic member 98, as shown in FIG. 11.

As indicated above, the extending rod of the stand can be tightly retained in position by the retainer through a cam-actuated operation such that providing structural stability of the stand and safety of use of the sawing machine can be achieved. Further, the handle can be adjusted to a suitable degree of tightness through its eccentric design, thereby enhancing the convenience of operating the retaining device of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A retaining device for a stand having a drawable extending rod, the retaining device comprising:
  a base having a through hole for penetration of the extending rod;
  a shaft inserted in the base;
  a handle having a cam portion and an eccentric hole through the cam portion, and pivotally mounted on the shaft through the eccentric hole;
  a retainer moveably mounted in the base and having a receiving hole in which the cam portion of the handle is received such that the retainer is moveable by a pivotal movement of the cam portion of the handle to stop the extending rod in position; and
  an adjustment unit including the shaft having an eccentric shaft portion passing through the eccentric hole of the handle, and a teeth portion at an end of the eccentric shaft portion, a screw inserted in the shaft and provided with a distal end passing through a retaining hole of the base, a nut screwed to the distal end of the screw, and an elastic member sleeved on the screw and stopped against the base and the shaft; wherein when the screw is tightened, the teeth portion of the shaft is engaged with a teeth hole of the base for preventing the shaft from rotation, and when the screw is loosened, the teeth portion of the shaft is disengaged from the teeth hole of the base by an elastic force of the elastic member for allowing the shaft to be rotatable.

2. The retaining device as claimed in claim 1, wherein the base has a protrusion and the retainer has an elongated slot for insertion of the protrusion.

3. The retaining device as claimed in claim 1, wherein the retainer has a V-shaped urging surface for stopping against the extending rod.

* * * * *